United States Patent [19]
Jacobson et al.

[11] Patent Number: 6,024,994
[45] Date of Patent: Feb. 15, 2000

[54] CALCIUM COMPLEXES FOR FORTIFICATION OF FOODS AND PROCESS OF MAKING

[75] Inventors: Mark Randolph Jacobson; Sekhar Reddy, both of New Milford, Conn.; Alexander Sher, Rockville, Md.; Dharam Vir Vadehra, New Milford; Elaine Regina Wedral, Sherman, both of Conn.

[73] Assignee: Nestec S.A., Vevey, Switzerland

[21] Appl. No.: 08/965,665

[22] Filed: Nov. 6, 1997

[51] Int. Cl.$^7$ ........................................ A23L 1/304
[52] U.S. Cl. ........................... 426/74; 426/573; 426/577; 426/578; 426/580; 426/590; 426/654
[58] Field of Search ............... 426/580, 74, 654, 426/573, 577, 578, 590

[56] References Cited

U.S. PATENT DOCUMENTS

| | | | |
|---|---|---|---|
| 2,594,439 | 4/1952 | Baker et al. | 426/577 |
| 2,871,123 | 1/1959 | Bauer et al. | 99/54 |
| 3,943,264 | 3/1976 | Davis | 426/654 |
| 4,180,595 | 12/1979 | Lauredan | 426/575 |
| 4,268,533 | 5/1981 | Williams et al. | 426/577 |
| 4,701,329 | 10/1987 | Nelson et al. | 426/74 |
| 4,722,847 | 2/1988 | Heckert | 426/74 |
| 4,834,990 | 5/1989 | Amer | 426/74 |
| 4,840,614 | 6/1989 | Harada et al. | 426/580 |
| 4,851,243 | 7/1989 | Andersen et al. | 426/74 |
| 4,871,554 | 10/1989 | Kalala et al. | 426/74 |
| 4,919,963 | 4/1990 | Heckert | 426/599 |
| 5,401,524 | 3/1995 | Burkes | 426/654 |
| 5,514,387 | 5/1996 | Zimmerman et al. | 426/654 |
| 5,550,232 | 8/1996 | Keating | 426/74 |
| 5,609,897 | 3/1997 | Chandler et al. | 426/73 |

FOREIGN PATENT DOCUMENTS

| | | |
|---|---|---|
| 0709033 | 1/1996 | European Pat. Off. . |
| 4111040 | 4/1991 | Germany . |
| 3014536 | 1/1991 | Japan . |
| 436166 | 2/1992 | Japan . |
| 5-238940 | 9/1993 | Japan . |
| 8-56567 | 3/1996 | Japan . |
| 359162847A | 9/1998 | Japan . |

OTHER PUBLICATIONS

Guamis–Lupez et al., "Calcium enrichment of skimmed milk given UHT Treatment", 1996 Alimentaria, No. 271, p. 79–82.

*Primary Examiner*—Helen Pratt
*Attorney, Agent, or Firm*—Pennie & Edmonds LLP

[57] ABSTRACT

A novel calcium complex for the fortification of beverages and foods, especially milk, is disclosed. The fortifying complexes contain a calcium source and a negatively-charged emulsifier with or without an organic or inorganic acid or a salt thereof. These complexes have been found to be particularly effective in fortifying milk and milk-protein containing beverages without coagulation of the proteins or without significantly changing the texture of the product.

19 Claims, No Drawings

CALCIUM COMPLEXES FOR FORTIFICATION OF FOODS AND PROCESS OF MAKING

FIELD OF INVENTION

The present invention relates to the fortification of foods and beverages, particularly those containing milk proteins, with calcium.

BACKGROUND OF THE INVENTION

Milk is an important source of dietary calcium. Calcium, the most abundant mineral in body, is a major constituent of bone and teeth. This mineral also plays an important role in several physiological systems. Calcium is important for healthy bone and tooth development in the young and therefore an adequate intake is essential. Calcium status may also be a factor in the development of osteoporosis in elderly people.

Since the body does not produce minerals, it is totally dependent on an external supply of calcium, nutritional or supplementary. The importance of adequate calcium intake is recognized during the whole life of the human being. In 1994, the NIH Consensus Development Panel revised recommended daily allowances for calcium intake for each age group from 800–1200 mg per day to 1500 mg per day.

It has been suggested that calcium in association with caseins may improve absorption in the gastrointestinal tract. Also it has been found that organic acids salts of calcium are more bioavailable in general than the inorganic salts. Calcium citrate has advantages over other calcium salts for use in fortified foods because of high bioavailability. For example, calcium citrate, as opposed to calcium in general, has only a marginal effect of interfering with the absorption of other minerals, especially iron. Also, long-term calcium supplementation with calcium citrate can reduce the risk of formation of kidney and urinary stones since citrate ions are inhibitors for crystallization of stone-forming calcium salts.

Addition of calcium to beverages, especially milk, can be very difficult. If slightly or completely insoluble sources of calcium are used, precipitation of the salts can occur especially if stabilizers are not used. If highly soluble sources of calcium (calcium chloride, etc.) are used, interation between the calcium and calcium sensitive ingredients, such as milk protein, can occur. These interactions can lead to coagulation of the ingredients during temperature treatment even at pasteurization temperature. In addition, the pH of some calcium salt systems may not be compatible with other ingredients or affects the flavor.

U.S. Pat. Nos. 4,701,329 and 4,851,243 disclose the use of tribasic calcium phosphate, carrageenan, and guar in calcium- and phosphorous-enriched milk. In this system, the use of stabilizing gums is necessary to prevent sedimentation of the insoluble calcium salt, which also increases the thickness of the milk.

U.S. Pat. No. 4,840,814 involves a process for preparing calcium enriched milk in which the milk is heat-treated prior to soluble calcium salt addition. This requires additional processing, and could also effect the quality of the milk. In addition, this method is limited to allowing only up to a 30 mg % increase in the calcium.

A series of patents such as U.S. Pat. Nos. 4,722,847, and 4,919,963 (and many subsequent patents), disclose the use of calcium citrate-malate complexes for the fortification of beverages, beverage concentrates, and as supplements. These systems are stable when the pH is kept below pH 5. For a number of beverages this pH would result in acidic flavors and instability of proteins, especially milk proteins. This problem is also encountered in U.S. Pat. Nos. 4,871,554 and 5,500,232.

EP 0709033 discloses preparation of calcium-supplemented milk drinks through the use of minerals extracted from whey. Although this creates products with good flavor and stability the level of supplementation is limited to 40 mg %.

SUMMARY OF THE INVENTION

We have developed a complex comprising a calcium source and a negatively-charged emulsifier with or without an organic or inorganic acid or a salt thereof, which may be used to fortify beverages and foods, with improved palatability without affecting product quality.

According to the present invention, there is provided a complex formed by the interaction of a suitable calcium source, a negatively charged emulsifier with or without an organic or inorganic acid or a salt thereof.

The complexes work particularly well in systems that contain calcium-sensitive components, such as proteins.

DETAILED DESCRIPTION OF THE INVENTION

The calcium source that is primarily used to create this complex can include calcium hydroxide, calcium carbonate, calcium chloride, calcium phosphate, calcium sulfate, calcium nitrate, calcium lactate, calcium fumarate, calcium citrate, calcium acetate, calcium glycerophosphate or calcium oxide but is preferably calcium hydroxide. The use of an alkaline source, such as calcium hydroxide, advantageously neutralises the pH of the complex. If a non-alkaline calcium source is used, then an alkaline agent must be added to neutralize the pH of the complex, of which any food grade alkaline agent can be utilized.

The negatively-charged emulsifiers that can be used to form the complex include but are not limited to citric acid esters of monoglycerides CITREM, (Danisco Ingredients, Inc., New century, Kans.), stearoyl lactylate (sodium, calcium, or acid), enzyme modified lecithin, stearyl citrate, fatty acids and their salts, or diacetyl tartaric acid esters of monoglycerides. CITREM is most preferred. The emulsifiers used are not limited to those of a single acyl or fatty acid component, such as on a specific carbon chain length or degree of unsaturation.

The emulsifier used is preferably hydrated, making the emulsifier more dispersable, and allowing easier exchange with cations. This can be accomplished by various means dependent on the type of emulsifier used, and are commonly known to those familiar with the art. For example, a common method of hydration is by heating a slurry of emulsifier and water to above 70° C. for a period of time (generally more than 10 min.). Once hydrated, the emulsifier dispersion is cooled to near room temperature.

Any one of a number of acids can be used including organic acids such as citric, lactic, malic, fumarate, gluconic, succinic, tartaric, or ascorbic, or inorganic acids such as phosphoric. Salts of these acids that can be utilized include potassium, sodium, or calcium salts of the aforementioned acids. For this invention, the most preferred acid is citric acid. Optionally, the complex may be dried and, if desired, stored before further use for fortification of a foodstuff.

The amounts needed to form the complex are not critical provided that sufficient amounts of each component are present. Simple mixing of the components is sufficient to form the complex. When an acid is not used in the complex, the weight ratio of calcium (from the calcium source) to surfactant should range from 1:10 to 10:1, and preferably from 2:1 to 1:2. When an acid is used in the complex, the weight ratio of acid to calcium should range from 5:1 to 1:5, and preferably from 2:1 to 1:2, while the weight ratio of calcium to surfactant can range from 100:1 to 1:5. The components are preferably dissolved in water to facilitate mixing and complex formation. The concentration of the solutions are preferably 1–5% by weight or greater. The person of ordinary skill in the art can readily determine convenient amounts to use for any particular application.

The complex may conveniently be formed by the interaction of a suitable calcium source, a negatively charged emulsifier, with or without an organic or inorganic acid or a salt thereof. For example, the complex may be prepared by adding acid or a salt of an acid to the emulsifier with mixing, and then adding the calcium source.

When an alkaline calcium source such as calcium hydroxide is added, the pH of the system is neutralized. Alternately, a non-alkaline calcium source can be added, followed by the neutralization with alkaline agent. Any food grade alkaline agent may be used for neutralisation including but not limited to sodium hydroxide, potassium hydroxide, magnesium hydroxide, sodium carbonate, sodium bicarbonate, potassium carbonate and potassium bicarbonate.

The present invention also provides a fortified foodstuff with a fortifying amount of a complex comprising calcium and a negatively-charged emulsifier with or without an organic or inorganic acid or a salt thereof.

The foodstuff may be a dairy based product such as a milk beverage, a liquid nutritional product or other beverage such as a juice, or a confectionary product such as ice cream.

The fortified foodstuff comprising a fortifying amount of a complex may be prepared by forming a complex and adding the complex to the foodstuff. The foodstuff can then be heat treated by normal means without any loss in quality such as precipitation, coagulation, or fouling of processing equipment. The resulting fortified foodstuff is similar to its unfortified counterpart in organoleptic quality. It has a similar color and taste, without major changes to the texture, viscosity or mouthfeel of the foodstuff.

The amount of complex to add to the foodstuff is not critical and is dependent upon the calcium content of the complex and the desired level of fortification. Typically, enough of the complex would be added to fortify the foodstuff from 5% to 200% of the recommended daily allowance for calcium, although even greater amounts are possible, if desired.

Advantageously, a stabiliser may be added to the foodstuff, preferably before the complex is added to the foodstuff. The stabiliser may be added to the foodstuff in the form of an aqueous solution or suspension or as a dry powder. Stabilisers that may be used may include but are not limited to carrageenan, xanthan, gellan, pectin, alginates, gumarabic, carboxymethylcellulose, modified and unmodified starches, propylene glycol alginate, locust bean gum, guar gum, hydroxylpropyl cellulose, hydroxypropylmethyl cellulose, methyl cellulose or mixtures of two or more thereof. Preferably for dairy products, carrageenan is used as a stabiliser.

The following Examples further illustrate the present invention.

EXAMPLES

Example 1

The following example is intended to demonstrate that a variety of emulsifiers and/or calcium sources can be effective in preparing these complexes.

Complexes for fortification of milk were prepared according to the following formulations:

| Sample | Emulsifier | Amount | Acid | Amount | Calcium Source | Amount |
| --- | --- | --- | --- | --- | --- | --- |
| 1 | SSL | 2.52 g | Citric | 1.19 g | Calcium hydroxide | 0.84 g |
| 2 | CSL | 5.25 g | Citric | 1.58 g | Does not apply | |
| 3 | SSL | 2.52 g | Citric | 1.19 g | Calcium lactate | 3.47 g |
| 4 | SSL | 3.02 9 | Citric | 1.41 g | Calcium hydroxide | 0.84 g |
| 5 | CITREM | 2.97 g | Citric | 1.19 g | Calcium hydroxide | 0.84 g |
| 6 | CITREM | 2.97 | Citric | 1.19 | Calcium hydroxide | 0.90 |

SSL = Sodium stearoyl-2-lactylate, CSL = calcium stearoyl-2-lactylate

Emulsifier was mixed with 50 ml water, the dispersion was heated to 150° F., and then cooled to 100° F. For samples 1–3, a solution of the acid in 10 ml water was then added to the hydrated emulsifier with vigorous mixing. For samples 4 and 5, the acid was added directly to the hydrated emulsifier with vigorous stirring. When applicable, a dispersion of the calcium source in 10 ml water was then added to the emulsifier-acid suspension with vigorous stirring. 6.6 g non-fat dry milk was added to 700 mL of skim milk under agitation. The resulting complex was added with vigorous stirring to sufficient skim milk (at 120° F.) to bring the final volume of calcium fortified milk to 750 mL. The pH of the milk was adjusted to 7.0 using a 30% sodium hydroxide needed. The milk was then homogenized at a total pressure of 2500/500 psi using a two-stage APV Rannie® Homogenizer. The fortified milk was filled into 125 ml baby food jars, pasteurized at 163° F. for 15 sec, cooled rapidly in a ice water bath, then stored in a refrigerator.

Samples were evaluated for sedimentation and taste after 1 week and for sedimentation after 2 weeks.

Results:

| Sample | 0 weeks | 1 week | 2 weeks |
| --- | --- | --- | --- |
| 1 | no sediment | Sl.sediment, sl.Emulsifier flavor | some sediment |
| 2 | no sediment | Sl.sediment, good flavor | Sl.sediment |
| 3 | no sediment | Sl.sediment, sl.Emulsifier flavor | some sediment |
| 4 | no sediment | no sediment, good flavor | some sediment, good flavor |
| 5 | no sediment | no sediment, good flavor | no sediment, good flavor |
| 6 | no sediment | no sediment, good flavor | no sediment, good flavor |

Example 2 i) A slurry of 450 g CITREM® was mixed with 15 kg water at room temperature for 60 min. The suspension was heated to 165° F. and held at that temperature for 10 min with agitation, then cooled to 90° F. (suspension #1). A solution of 544.5 g citric acid in 6.1 kg water was prepared by mixing at room temperature (solution #2) A sodium hydroxide suspension was prepared by mixing 333.0 g sodium hydroxide in 5,000 g water at room temperature (suspension #3). Solution #2 was added to suspension #1 and mix well for 60 min. Suspension #3 was then added and the resulting suspension was mixed for 60 min.

ii) To 10 kg skim milk at 40–60° F., 45.0 g carrageenan (SeaKem CM611, FMC Corporation, Philadelphia, Pa.) was added with mixing for 5 min. The milk was then heated to 165° F. and held at 165° F. for 5 min under agitation.

iii) To 260 kg g skim milk, 2505.0 g non-fat dry milk (NFDM) was added at 40–60° F. and the milk was mixed for 10 min. The milk was then heated to 120° F., and the carrageenan/milk mixture (ii) was added slowly and the resulting milk was mixed for 5 min. The milk was heated to 149° F. and held for 5 min. The milk was cooled to 90° F. and the calcium complex was added slowly. The resulting calcium fortified milk was mixed for 10 min and 22.5 g cream/milk flavor was added. The pH of the milk was adjusted with 10% potassium hydroxide solution to 6.9–7.0. The solids content was checked.

iv) Samples were then heat treated under the following conditions.

Pateurization:

The calcium fortified milk was homogenized at 120° F. and pressure 25000/500 psi. The milk was then pasteurized at 163° F. for 15 sec. and filled into 330 mL glass bottles. The bottles of milk were then cooled in cold water and stored under refrigeration at 40° F.

UHT-pasteurization, Plate Heat Exchanger (PHE):

Calcium fortified milk was pre-heated to 160° F., then heated to 285° F. and held at 285° F. for 5 sec, and cooled to 160° F. The milk was then homogenized at pressure 2500/500 psi., cooled to 60° F. and filled in 250 mL Tetra Brik Aseptic packages (Tetra Pak Inc., Chicago).

UHT-pasteurization Steam Injection (SI):

Calcium fortified milk was pre-heated to 175° F., then heated to 285° F. by steam injection, held at 285° F. for 5 sec, and cooled to 175° F. The milk was homogenised at pressure 2500/500 psi, cooled to 60° F. and filled in 250 mL Tetra Brik Aseptic packages (Tetra Pak Inc., Chicago).

UHT-sterilization (PHE):

Calcium fortified milk was pre-heated to 160° F., then heated to 298° F. by plate heat exchangers and held at 298° F. for 5 sec, and cooled to 160° F. The milk was homogenised at pressure 2500/500 psi, cooled to 60° F. and filled in 250 mL Tetra Brik Aseptic packages (Tetra Pak Inc., Chicago).

UHT-sterilization (SI):

Calcium fortified milk was pre-heated to 175° F., then heated to 298° F. by steam injection, held at 298° F. for 5 sec, and cooled to 175° F. The milk was homogenised at pressure 2500/500 psi, cooled to 60° F. and filled in 250 mL Tetra Brik Aseptic packages (Tetra Pak Inc., Chicago).

The results are given in the following table:

Results from Example 2

| DESCRIPTION | AGE wk. | STORAGE TEMP (° F.) | CENTRIFU( SEDIMENT* (%) | CALCIUM LEVEL** (ppm) | BOILING TEST*** | OBSERVATIONS | SENSORY EVALUATION |
|---|---|---|---|---|---|---|---|
| Calcium hydroxide, citric acid, | 0 | 40 | N/A | 1868 | No flocculation | No precipitation | Good flavor |
| CITREM Pasteurized | 2 | 40 | N/A | 1854 | No flocculation | No precipitation | Good flavor |
| Calcium hydroxide, citric acid, | 0 | 40 | 0.03 | 1890 | No flocculation | No precipitation | Good flavor |
| CITREM UHT pasteurized (SI) | 2 | 40 | 0.03 | 1860 | No flocculation | No precipitation | Good flavor |
|  | 4 | 40 | N/A | 1860 | No flocculation | No precipitation | Good flavor |
|  | 8 | 40 | N/A | 1860 | No flocculation | No precipitation | Good flavor |
|  | 8 | 40 | N/A | 1840 | No flocculation | No precipitation | Good flavor |
| Calcium hydroxide, citric acid, | 0 | 40 | N/A | 1894 | No flocculation | No precipitation | Good flavor |
| CITREM UHT pasteurized (PHE) | 2 | 40 | N/A | N/A | No flocculation | No precipitation | Good flavor |
|  | 4 | 40 | N/A | N/A | No flocculation | No precipitation | Good flavor |
|  | 6 | 40 | N/A | N/A | No flocculation | No precipitation | Good flavor |
|  | 8 | 40 | N/A | 1928 | No flocculation | No precipitetion | Good flavor |
| Calcium hydroxide, citric acid, | 0 | 80 | 0.12 | 1910 | No flocculation | No precipitation | Good flavor |
| CITREM UHT sterilized (SI) | 2 | 80 | N/A | 1860 | No flocculation | No precipitation | Good flavor |
|  | 4 | 80 | N/A | 1860 | No flocculation | No precipitation | Good flavor |
|  | 6 | 80 | N/A | 1840 | No flocculation | No precipitation | Good flavor |
|  | 8 | 80 | N/A | 1850 | No flocculation | No precipitation | Good flavor |
|  | 11 | 80 | 0.08 | N/A | No flocculation | No precipitation | Good flavor |
|  | 13 | 80 | 0.02 | N/A | No flocculation | No precipitation | Good flavor |
|  | 16 | 80 | 0.04 | 1906 | No flocculation | No precipitation, slight getation | Acceptable flavor |
| Calcium hydroxide, citric acid, | 0 | 80 | N/A | 1910 | No flocculation | No precipitation | Good flavor |
| CITREM UHT sterilized (PHE) | 2 | 80 | N/A | 1860 | No flocculation | No precipitation | Good flavor |
|  | 4 | 80 | N/A | 1860 | No flocculation | No precipitation | Good flavor |
|  | 6 | 80 | N/A | 1840 | No flocculation | No precipitation | Good flavor |
|  | 8 | 80 | N/A | 1850 | No flocculation | No precipitation | Good flavor |
|  | 11 | 80 | N/A | N/A | No flocculation | No precipitation | Good flavor |
|  | 13 | 80 | N/A | N/A | No flocculation | No precipitation | Good flavor |

-continued

Results from Example 2

| DESCRIPTION | AGE wk. | STORAGE TEMP (° F.) | CENTRIFU(SEDIMENT* (%) | CALCIUM LEVEL** (ppm) | BOILING TEST*** | OBSERVATIONS | SENSORY EVALUATION |
|---|---|---|---|---|---|---|---|
| | 16 | 80 | N/A | 1906 | No flocculation | No precipitation, slight gelation | Acceptable flavor |

*% sediment was determined from sediment weight after centrifugation at 1800 g for 5 min and drying of resulting pellet at room temperature overnight
**Total calcium content was determined using a Leeman Laba, model PS 1 AES-ICP spectrometer after dry ashing and ash dissolving in nitric acid and water (1:1)
***Flocculation was determined by visual inspection. Milk was boiled 15 sec then placed immediately on the convexed surface of a watch glass for inspection

Example 3

To 25 kg water at 185° F., 720 g CITREM were added and mixed for 5 min., then cooled to 110° F. While under agitation 871 g citric acid were added, and the suspension was mixed for 5 min. 533 g calcium hydroxide was added under agitation and the complex was mixed for 60 min. Steps ii, iii and iv from Example 2 were then followed.

The results are given in the following Table:

| Description | Age wk | Storage Temp (°F.) | Centrifuge Sediment* (%) | Calcium Level** ppm | Boiling Test*** | Observations | Sensory Evaluation |
|---|---|---|---|---|---|---|---|
| Calcium hydroxide, citric acid, CITREM, UHT pasteurized (SI) | 0 | 40 | 0.07 | 2041 | No flocc-ulation | No precipi-tation | Good Flavor |
| | 2 | 40 | 0.04 | N/A | No flocc-ulation | No precipi-tation | Good Flavor |
| | 4 | 40 | 0.04 | N/A | No flocc-ulation | No precipi-tation | Good Flavor |
| | 6 | 40 | 0.04 | N/A | No flocc-ulation | No precipi-tation | Good Flavor |
| | 8 | 40 | 0.02 | 2048 | No flocc-ulation | No precipi-tation | Good Flavor |
| | 10 | 40 | 0.04 | N/A | No flocc-ulation | No precipi-tation | Good Flavor |

* % sediment was determined from sediment weight after centrifugation at 1800 × g for 5 min and drying of resulting pellet at room temperature overnight
** Total calcium content was determined using a Leeman Labs model PS 1 AES-ICP spectrometer after dry ashing and ash dissolving in nitric acid and water (1:1)
*** Flocculation was determined by visual inspection. Milk was boiled 15 sec then placed immediately on the convexed surface of a watch glass for inspection.

Other samples from Example 3 performed very similarly to samples with corresponding heat treatments from Example 2.

Example 4

This Example shows how the complex can be formed directly in milk.

Step 1 from Example 2 was followed to prepare a calcium complex. To 275 kg milk at 40–60° F., 45.0 g SeaKem CM 611 carrageenan was added with mixing. To the milk was added 2505.0 g NFDM, 22.5 g cream/milk flavor, the Ca-complex and the resulting fortified milk was mixed for 5 min. The pH was adjusted with 10% potassium hydroxide solution to 6.9–7.0. The solids content was checked. Step iv from example No 2 was then followed.

Samples from Example 4 performed very similarly to samples with corresponding heat treatments from Example 2.

Example 5

To 800 g water at 185° F., 24.0 g CITREM was added and mixed for 5 min, then cooled to <110° F. While under agitation, 29.0 g citric acid was added and mixed for 5 min. Calcium hydroxide (17.77 g) was added under agitation and resulting complex was mixed for 60 min.

To 300 g skim milk at 40–60° F., 1.5 g SeaKem CM 611 carrageenan was added and the milk mixed for 5 min. The milk was then heated to 165° F. and held at 165° F. for 5 min under agitation.

To 8.9 kg skim milk at 40–60° F., 83.5 g NFDM was added and the milk was mixed for 10 minutes. Milk was heated to 120° F. and the carrageenan/milk was added slowly and mixed for 5 minutes. Milk was heated to 149° F., held at that temperature for 5 min, then cooled to 90° F. The calcium complex was added slowly, the milk was mixed for 10 min, and 0.75 g cream/milk flavor was added. The pH was adjusted with 10% potassium hydroxide solution to 6.9–7.0. The solids content was checked.

The calcium fortified milk was placed in 330 ml glass jars, autoclaved for 5 min at 250° F. then cooled to room temperature.

The autoclaved milk fortified with Ca-CITREM-citric acid complex at a total calcium level of 2160 ppm performed similarly to the UHT sterilized samples—see Example 2, UHT sterilization (SI).

We claim:
1. A separately formed calcium complex formed by the interaction of a calcium source with a negatively charged emulsifier and with an organic or inorganic acid selected from the group consisting of citric, lactic, malic, fumaric, gluconic, succinic, tartaric, ascorbic, or phosphoric or a salt thereof.

2. A complex according to claim 1 wherein the calcium source is calcium hydroxide, calcium carbonate, calcium chloride, calcium phosphate, calcium sulfate, calcium nitrate, calcium lactate, calcium fumarate, calcium citrate, calcium acetate, calcium glycerophosphate or calcium oxide.

3. A complex according to claim 1 wherein the negatively-charged emulsifier is a citric acid ester of monoglycerides, stearoyl lactylate (sodium, calcium, or acid), enzyme modified lecithin, stearyl citrate, fatty acids and their salts, or a diacetyl tartaric acid esters of monoglycerides.

4. A complex according to claim 1 wherein the emulsifier is in a hydrated form.

5. A complex according to claim 1 which is in a dry form.

6. A process of preparing a complex which comprises interacting a suitable calcium source with a negatively charged emulsifier, optionally with an organic or inorganic acid or a salt thereof under interaction conditions sufficient to form the complex.

7. A process of preparing a complex according to claim 6 which comprises adding acid or a salt of the acid to the emulsifier with mixing, and then adding the calcium source.

8. A process according to claim 6 wherein, when an alkaline calcium source is added, the pH of the system becomes neutralized.

9. A process according to claim 6 wherein when a non-alkaline calcium source is added, this is followed by neutralization with an alkaline agent.

10. A fortified foodstuff comprising a foodstuff and a fortifying amount of a complex comprising calcium and a negatively-charged emulsifier with or without an organic or inorganic acid or a salt thereof.

11. A fortified foodstuff according to claim 10 wherein the foodstuff is a dairy based product, a liquid nutritional product, a beverage, or a confectionary product.

12. A fortified foodstuff according to claim 10 wherein the foodstuff is a milk beverage, a juice or ice cream.

13. A process of preparing a fortified foodstuff as claimed in claim 10 which comprises forming a complex and then adding the complex to the foodstuff.

14. A process of preparing a fortified foodstuff according to claim 13 wherein the complex is added in an amount sufficient to provide from 5% to 200% of the recommended daily allowance for calcium in the foodstuff.

15. A process according to claim 13 wherein the foodstuff is a milk beverage or ice cream.

16. A process of preparing a fortified foodstuff according to claim 13 wherein a stabiliser is added to the foodstuff.

17. A process according to claim 16 wherein the stabiliser is carrageenan, xanthan, gellan, pectin, alginates, gum arabic, carboxymethylcellulose, modified and unmodified starches, propylene glycol alginate, locust bean gum, guar gum, hydroxylpropyl cellulose, hydroxypropylmethyl cellulose, methyl cellulose or mixtures of two or more thereof.

18. A fortified foodstuff according to claim 10 wherein the complex is present in an amount sufficient to provide from 5% to 200% of the recommended daily allowance for calcium in the foodstuff.

19. A fortified foodstuff according to claim 10 wherein the foodstuff is a milk beverage or ice cream.

* * * * *